March 12, 1963 J. MORKOSKI 3,080,932
CYLINDRICAL PLOW
Filed March 14, 1961 3 Sheets-Sheet 3
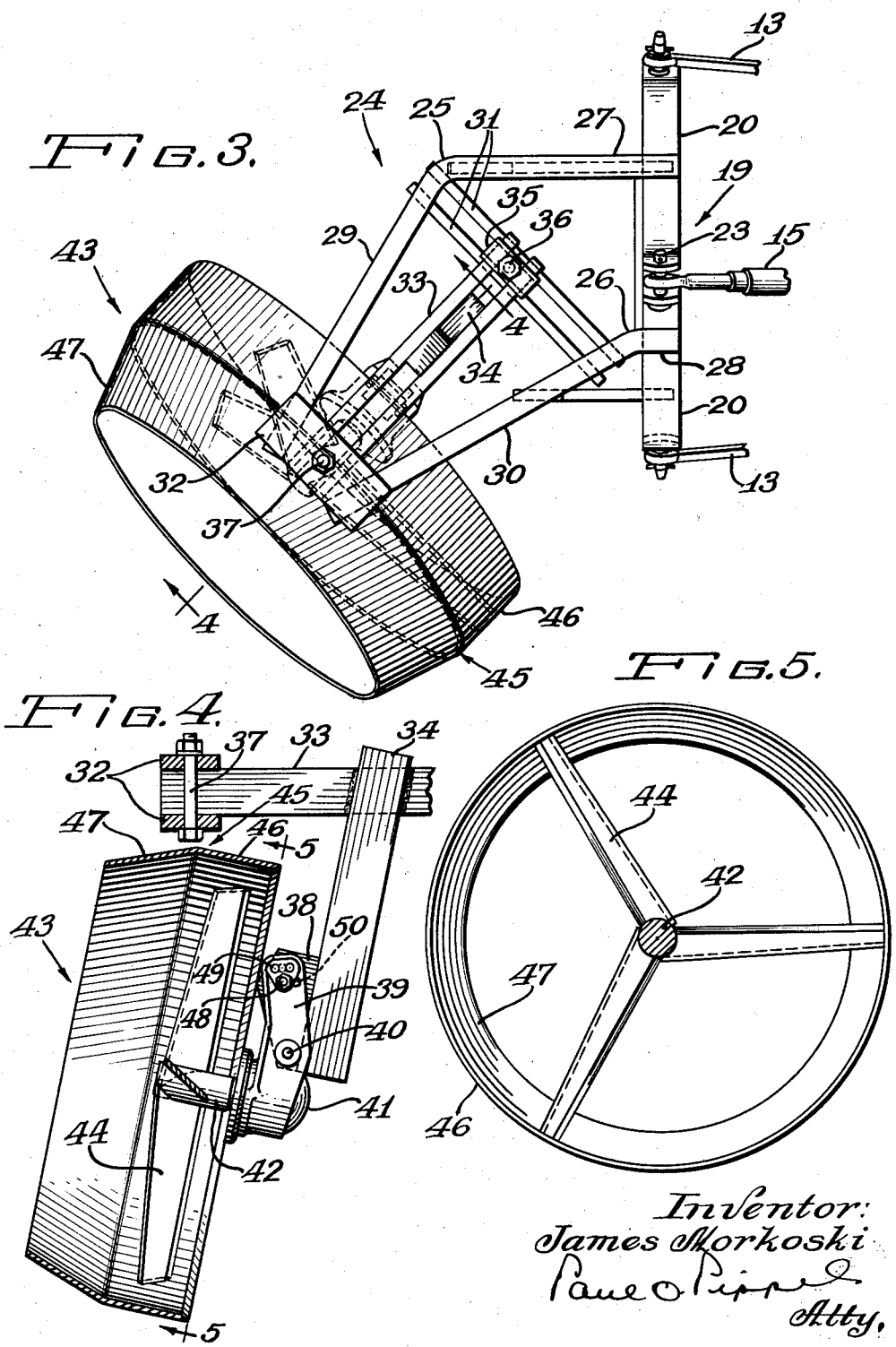
Inventor:
James Morkoski
Paul O. Pippel
Atty.

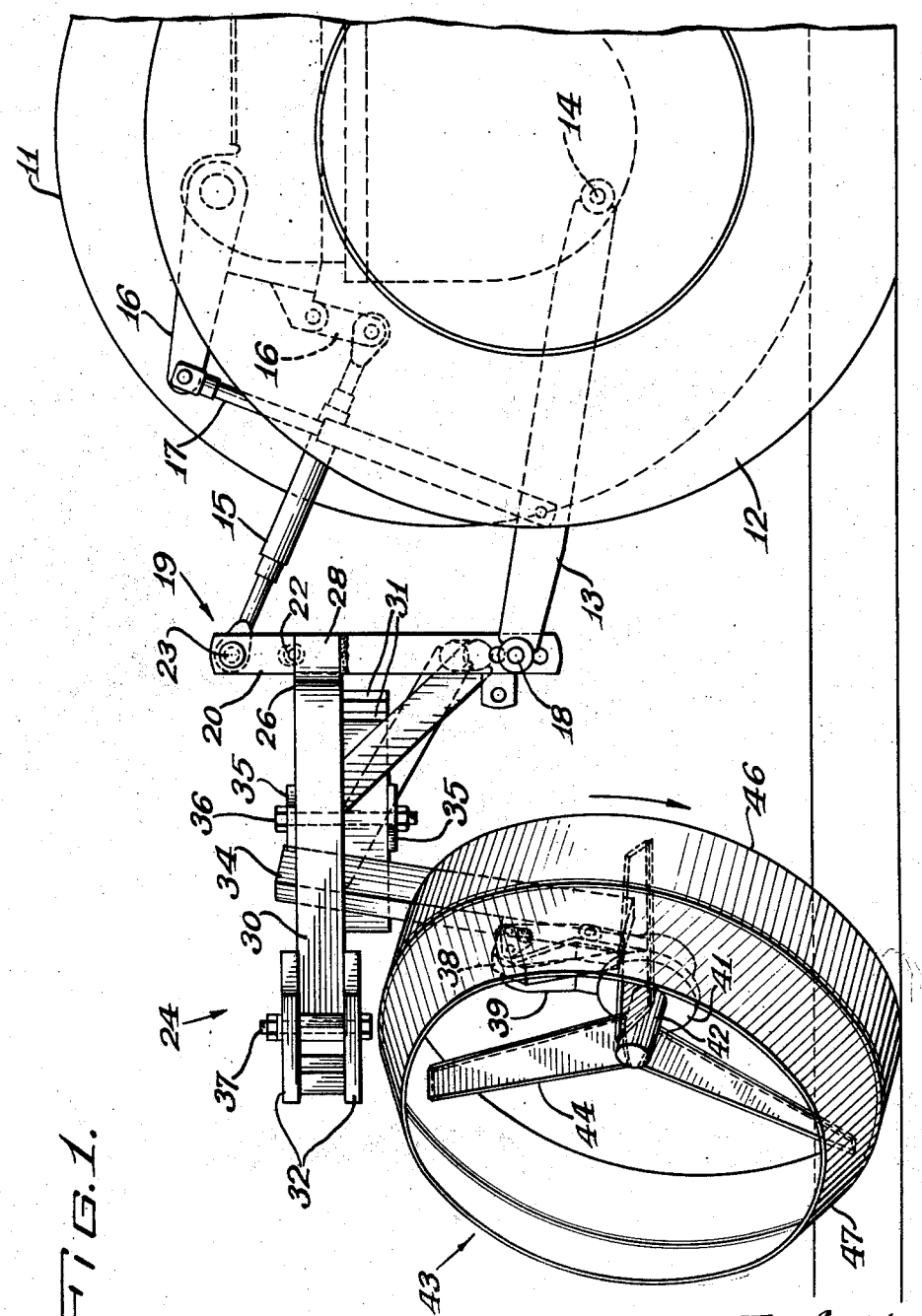

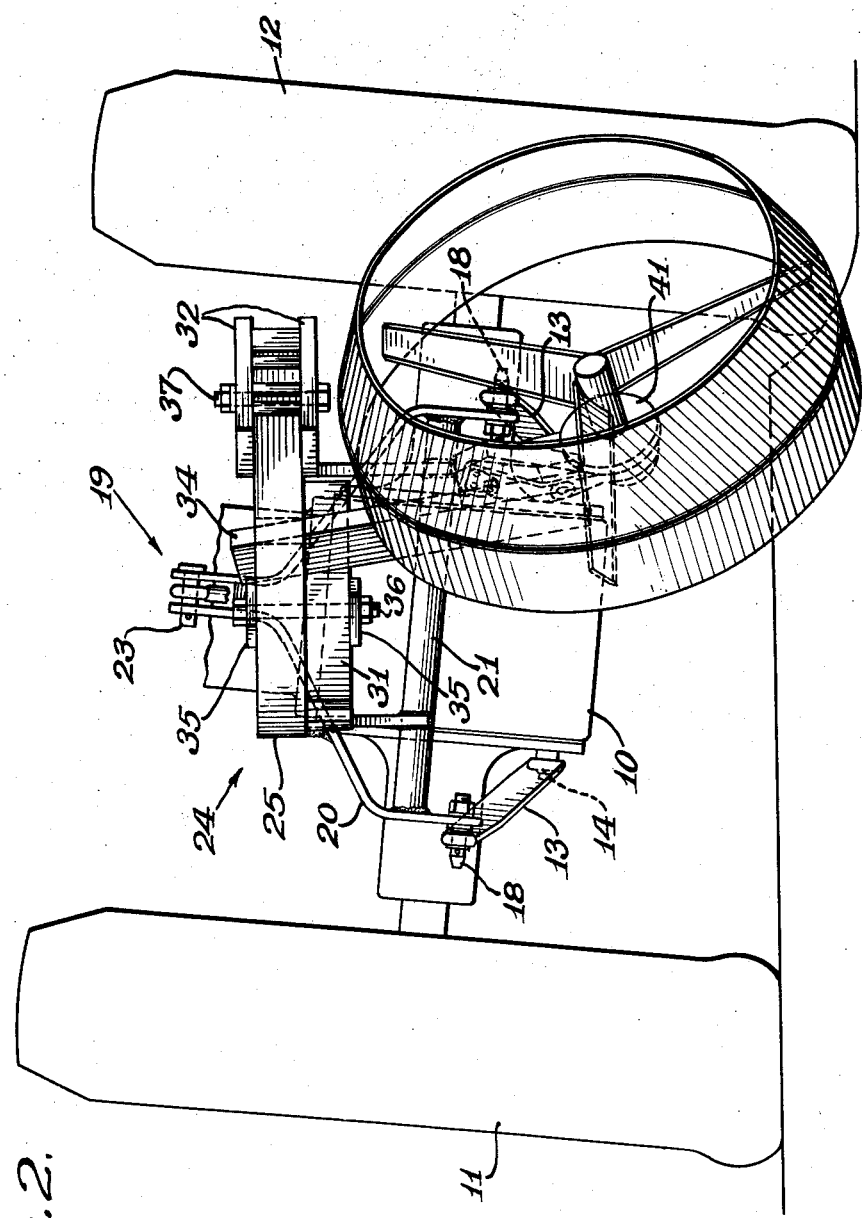

United States Patent Office 3,080,932
Patented Mar. 12, 1963

3,080,932
CYLINDRICAL PLOW
James Morkoski, Clarendon Hills, Ill., assignor to International Harvester Company, Chicago, Ill., a corporation of New Jersey
Filed Mar. 14, 1961, Ser. No. 95,681
6 Claims. (Cl. 172—557)

This invention relates to agricultural implements and particularly to plows. More specifically, the invention contemplates and has for its principal object the provision of a novel plow designed to overcome the deficiencies inherent in moldboard plows of conventional construction.

Another object of the invention is the provision of a plow of improved construction wherein the sliding friction of soil against the plow moldboard is minimized, thus lowering the power requirement for propelling the plow through the soil.

Another object of the invention is the provision of a novel plow body in the form of a cylinder or barrel open at both ends and which is revolved as it is propelled through the soil, the soil passing through the cylinder and being turned over by the rotation thereof.

Other objects and advantages of the invention will become clear from the following detailed description when read in conjunction with the accompanying drawings wherein:

FIGURE 1 is a view in side elevation of the rear end of a tractor having mounted thereon an implement embodying the features of this invention;

FIGURE 2 is a rear elevation of the structure shown in FIGURE 1, with parts removed for clarity;

FIGURE 3 is a plan view of a portion of the structure shown in FIGURE 1;

FIGURE 4 is a section taken on the line 4—4 of FIGURE 3; and

FIGURE 5 is a section taken on the line 5—5 of FIGURE 4.

In the drawings, the implement of this invention is shown to be mounted upon the rear of a tractor having a body 10 and laterally spaced rear drive wheels 11 and 12. The tractor is provided with a hitch of the three-point type comprising a pair of laterally spaced forwardly converging lower links 13 pivotally connected to the tractor body at 14 by means accommodating lateral and vertical swinging of the links, and a central upper link 15, triangularly arranged with respect to the lower links 13 and connected at its forward end to an arm 16 pivotally connected to the tractor. A pair of lift arms 16, only one of which is shown in the drawing, are connected by lift links 17 with the lower links 13 for the purpose of raising and lowering the links 13 and 15 and the implement connected thereto.

The rear ends of links 13 are pivotally connected for generally universal movement to studs 18 mounted at the lower ends of a yoke 19 comprising downwardly diverging members 20 connected at their lower ends by a cross brace 21 and at their upper ends by a bolt 22. Also extending between the upper ends of the members 20 is a pivot pin 23, to which is connected the rear end of upper tractor hitch link 15.

The yoke 19 forms part of the plow supporting frame 24, which also includes horizontal bars 25 and 26 having forward parallel sections 27 and 28, respectively, extending in the direction of travel of the tractor and implement, and laterally bent rear sections 29 and 30. Frame members 25 and 26 are connected medially of their ends by a pair of braces 31 affixed to the lower edges of the members 25 and 26, and to the upper and lower edges of the rear ends of these members are affixed a pair of plates 32. A tool support or beam 33 comprises a pair of bars embracing and affixed to the upper end of a plow standard 34. The forward end of beam 33 rests upon braces 31 and is adjustably secured thereto by a pair of vertically spaced plates 35 apertured to receive a bolt 36.

The rear end of beam 33 is pivoted upon a bolt 37 extending between plates 32 to accommodate lateral adjustment or swinging of the beam 33 about the axis thereof. This is accomplished by loosening bolt 36 and laterally shifting the beam within the limits provided by the spacing between the bolts 36 and the braces 31 the latter serving as a guide. If desired, a full range of adjustment of the beam can be achieved by forming the bracing bars 31 on an arc about the axis of bolt 37.

To the lower end of standard 34 is affixed a rearwardly extending lug 38 embraced by a bifurcated upright 39 and pivotally connected thereto by a pin 40 and carrying at its lower end a bearing 41 in which is rotatably received a stub shaft 42 upon which is mounted a generally barrel shaped plow body 43.

The portion of the stub shaft 42 projecting rearwardly from bearing 41 is enlarged and forms a hub to which is affixed a plurality of circumferentially spaced relatively thin spokes 44, to the radially outer edges of which is secured a band of steel 45 having a forward cylindrical portion 46 the forward edge of which is sharpened for ground penetration as indicated in FIGURE 4, and a frustoconical rear section 47.

As shown in the drawings, plow body 43 is tilted forwardly and faces laterally diagonally toward the furrow wall made by the plow body during operation. In this position the forward motion of the tractor and implement and the penetration of the plow body in the ground causes rotation thereof in the direction of the arrow in FIGURE 1, substantially lowering the frictional resistance to the soil encountered by conventional plows, causing the earth to pass upwardly and rearwardly through the cylinder or barrel and into the cone shaped rear section through which the dirt passes and is turned over as it leaves the plow body. Penetration is facilitated by angling the spokes 44 into the furrow wall and sharpening the forward edge thereof as indicated in FIGURE 4 to cut the furrow slice.

A bolt 48 connects the upper end of member 39 to lug 38 and adjustment in the angle made by the plow body 43 with the ground is made by the provision of several openings 49 in member 39 adapted to optionally receive bolt 48 and to register with a selected one of several openings 50 formed in lug 38.

The implement described herein performs an economical and efficient plowing operation in which improved soil penetration and lowered soil resistance are observed. It is believed that the construction and operation of the plow of this invention will be clearly understood from the foregoing description. It should likewise be understood that the invention has been described in its preferred embodiment only, and that modifications may be made therein without departing from the spirit of the invention or the scope of the appended claims.

What is claimed is:
1. In an agricultural implement having a mobile supporting frame, an earth working tool comprising a drum having a forward earth-penetrating cylindrical section and a rearward frusto-conical section arranged to change the direction of flow of the earth passing through the drum, means mounting said drum on the supporting frame for rotation in a forwardly tilted plane disposed at an angle to the direction of travel of the implement and facing diagonally laterally toward the furrow wall made by the drum in operation, and means incorporated in the supporting frame and operatively connected to said drum for adjusting the angle of the drum relative to the direction of travel thereof.

2. The invention set forth in claim 1, wherein said drum includes a hub and spokes extending therefrom to the inner periphery of the drum.

3. The invention set forth in claim 2, wherein said spokes are generally flattened and disposed at an angle to the axis of the drum, the forward edges of said spokes being arranged to engage and slice through the earth passing through the interior of the drum.

4. A mobile agricultural implement comprising a frame having hitch means thereon for connection thereof to a tractor, a cylindrical earth penetrating blade having a diameter substantially greater than the axial length thereof, and means mounting said cylindrical blade on said frame for rotation on an axis extending forwardly and downwardly and laterally.

5. A mobile agricultural implement comprising a frame having hitch means thereon for connection thereof to a tractor, a cylindrical earth penetrating blade having a diameter substantially greater than the axial length thereof, and means mounting said cylindrical blade on said frame for rotation on an axis extending forwardly and downwardly and laterally, said mounting means comprising a generally vertically extending standard carrying said cylindrical blade, a generally horizontal arm affixed at one end to the upper end of the standard, and pivot means connecting the other end of said arm to the frame to accommodate lateral swinging of the standard and blade about said pivot and for holding it in a selecting adjusted position.

6. The combination with a mobile frame of a rotary earth-working tool adapted to penetrate the soil, comprising a cylindrical earth-penetrating band section having an axial length substantially less than the diameter thereof and a frusto-conical section forming a rearward continuation of said band section, said tool being rotatable by its frictional engagement with the soil, and means rotatably mounting said tool on the frame.

References Cited in the file of this patent
UNITED STATES PATENTS

| | | |
|---|---|---|
| 127,677 | Bussell | June 11, 1872 |
| 257,914 | Baucum | May 16, 1882 |
| 301,313 | Willis | July 1, 1884 |
| 360,034 | Meikle | Mar. 29, 1887 |
| 1,084,166 | Petersen | Jan. 13, 1914 |